United States Patent [19]
Yates

[11] Patent Number: 4,948,221
[45] Date of Patent: Aug. 14, 1990

[54] ATHERMALIZED OPTICAL HEAD
[75] Inventor: Thomas E. Yates, Caledonia, N.Y.
[73] Assignee: Eastman Kodak Company, Rochester, N.Y.
[21] Appl. No.: 238,225
[22] Filed: Aug. 30, 1988
[51] Int. Cl.$^5$ ............................ G02B 6/36; G02B 7/26
[52] U.S. Cl. .............................. 350/96.20; 350/96.18; 372/108
[58] Field of Search ............... 350/96.20, 96.21, 96.18; 372/34, 36, 108

[56] References Cited
U.S. PATENT DOCUMENTS

| | | | |
|---|---|---|---|
| 4,295,152 | 10/1981 | Khoe et al. | 357/74 |
| 4,403,235 | 9/1983 | Fedder et al. | 346/160 |
| 4,604,753 | 8/1986 | Sawai | 372/36 |
| 4,631,728 | 12/1986 | Simons | 372/38 |
| 4,683,573 | 7/1987 | Albanese | 372/34 |

Primary Examiner—William L. Sikes
Assistant Examiner—Robert E. Wise
Attorney, Agent, or Firm—Donald D. Schaper

[57] ABSTRACT

A athermalized optical head is disclosed which comprises a light source such as a laser diode and an optical element, for example, a collimating lens. The collimating lens and the laser diode are mounted along a common optical axis. A thermoelectric cooling element is provided in the head to control the temperature of the laser diode. In order to maintain a spot produced by the head in focus during changes in ambient temperature, the laser diode and the lens are mounted such that the distance between the diode and the lens is maintained constant over a predetermined temperature range.

9 Claims, 2 Drawing Sheets

ATHERMALIZED OPTICAL HEAD

BACKGROUND OF THE INVENTION

1. Field of the Invention

This invention relates to an athermalized optical head which is adapted to support a light source and an optical element, and more particularly, to such an optical head which is particularly suitable for use with a laser diode.

2. Description of the Prior Art

Laser diodes are used in certain types of scanning apparatus to project a laser beam onto a polygon mirror which is adapted to scan the beam onto a recording medium. One of the problems in such apparatus is in maintaining the focus of a laser spot, since the distance between the laser diode and a collimating lens changes with changes in ambient temperature. As the ambient temperature changes, even slightly, the materials in the supports for the laser and the collimator expand or contract. This movement changes the relative positions of the laser and the collimator and causes the laser spot to be out of focus. The problem of maintaining a laser diode an exact distance from a lens was recognized in U.S. Pat. No. 4,295,152. In this patent, an optical coupler is provided with a telescoping housing which can be adjusted to position a semiconductor laser an exact distance from a lens. There is no solution in this patent, however, to the problem of maintaining a constant distance between the diode and the lens with changes in ambient temperature.

It is common in apparatus using laser diodes to control the temperature of the laser diode in order to maintain a constant output from the laser diode. In U.S. Pat. No. 4,403,235, for example, there is disclosed an imaging system which comprises a laser diode which is surrounded by a thermoelectric cooling element. Such a device is effective in maintaining the temperature of the laser diode within an acceptable range. However, as the device pumps heat away from the laser diode, it causes localized thermal gradients which add distortion to expansion and contractions already present in the laser and collimator mounts. Thus, the thermoelectric cooling element contributes to the problems of maintaining a constant distance between the laser diode and the collimating lens.

SUMMARY OF THE INVENTION

It is an object of the present invention to overcome the problems discussed above in the prior art and to provide an athermalized optical head for a laser diode.

In accordance with one aspect of the invention, there is provided an athermalized optical head comprising: a light source disposed along an optical axis of the optical head; a first mounting means for the light source; optical means disposed along the axis in a position to receive a light beam from the source; a second mounting means for the optical means; and support means for receiving the first and second mounting means, the support means and the mounting means being constructed to maintain a constant distance between the light source and the optical means in a predetermined range of temperatures.

In one embodiment of the present invention an athermalized optical head comprises a light source, such as a laser diode, and an optical element, for example, a collimating lens. The collimating lens and the laser diode are mounted in the head along a common optical axis. A thermoelectric cooling element is provided to control the temperature of the laser diode. In order to maintain a spot produced by the head in focus with changes in ambient temperature, the laser diode and the lens are mounted such that the distance between the diode and the lens is maintained constant over a predetermined temperature range.

A principal advantage of the present invention is that the disclosed optical head can be used to produce a very high quality image as a result of maintaining the laser diode in focus over a wide range of operating temperatures. A further advantage of the invention is that laser is maintained in focus automatically, and there is no need for operator intervention.

Other features and advantages will become apparent upon reference to the following description of the preferred embodiment when read in light of the attached drawings.

DESCRIPTION OF THE PREFERRED EMBODIMENT

Figure 1:
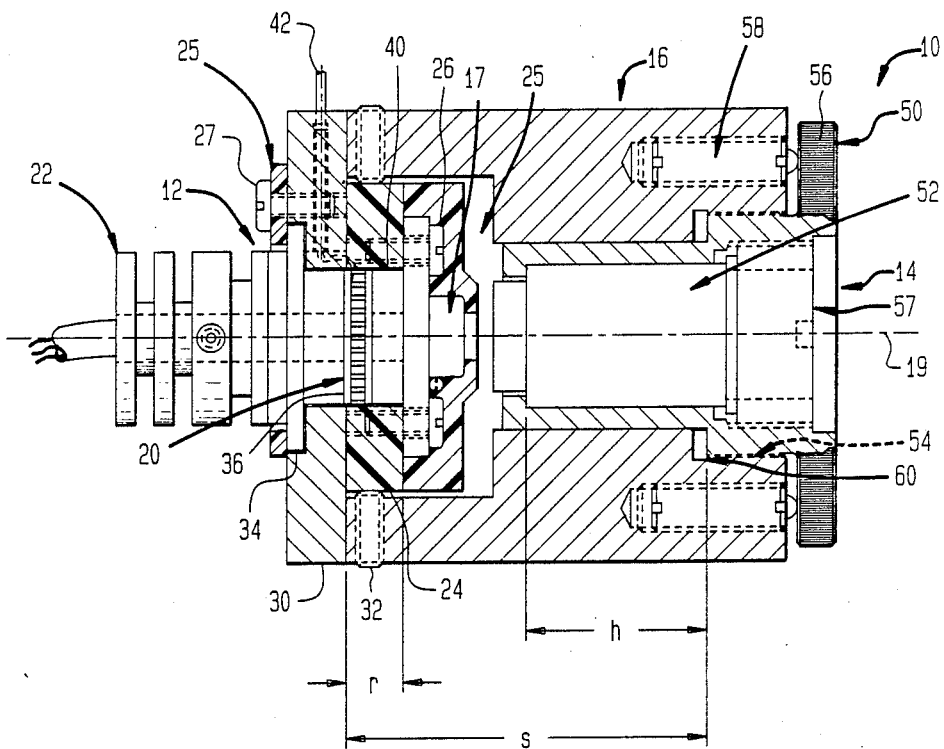
FIG. 1 is a side elevational view of the optical head of the present invention, with certain parts shown in section.

With reference to FIG. 1 there is shown an athermalized optical head 10 constructed in accordance with the present invention. Optical head 10 comprises a light source 12 and an optical device 14, both of which are supported in a tubular support 16 along an optical axis 19.

Light source 12 includes a laser diode 18, a thermal transFer plate 40, a thermoelectric cooling element 20, and a heat sink 22. As shown in FIG. 1, laser diode 18 is surrounded at an output side 17 by a cover 21 which is formed of an insulator material, such as No. 106 silicone, obtainable from the RTV Corporation. As will be apparent from the discussion of the thermoelectric cooling element 20 which follows, the main function of cover 21 is to prevent the pumping of heat from a cavity 25 in head 10. Diode 18 is mounted by means of fasteners 26 to an insulator ring 24 which is made of a glass filled polycarbonate, for example, such a material sold under the trademark Lexan 3414 by General Electric Co. Insulator ring 24 is mounted to an annular laser mount 30 by fasteners (not shown), and mount 30 is fixed to support 16 by fasteners 23. Laser mount 30 can be, for example, copper. Set screws 32 in support 16 are threaded into contact with insulator ring 24 to align light source 12 relative to optical device 14.

Figure 2:
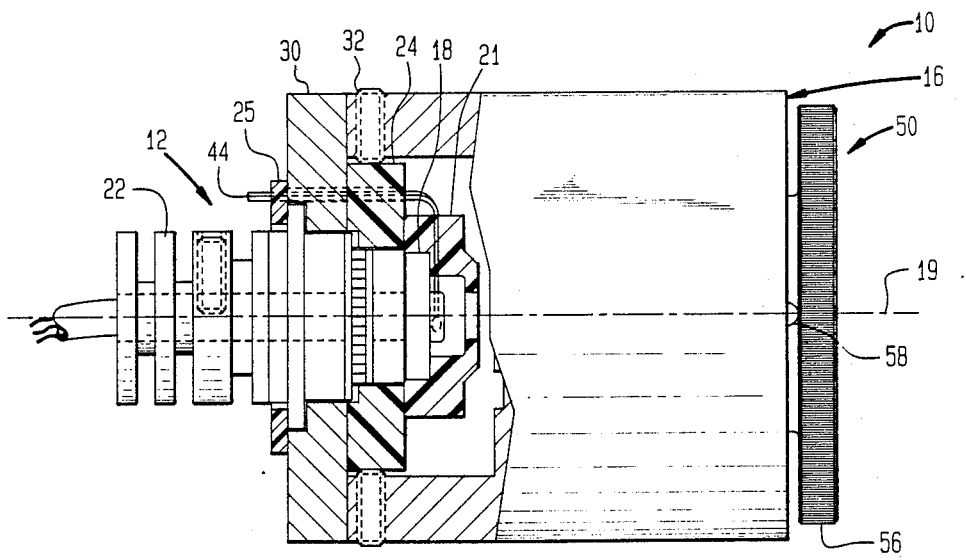
FIG. 2 is a top plan view of the optical head shown in FIG. 1, with certain parts shown in section.
Figure 3:
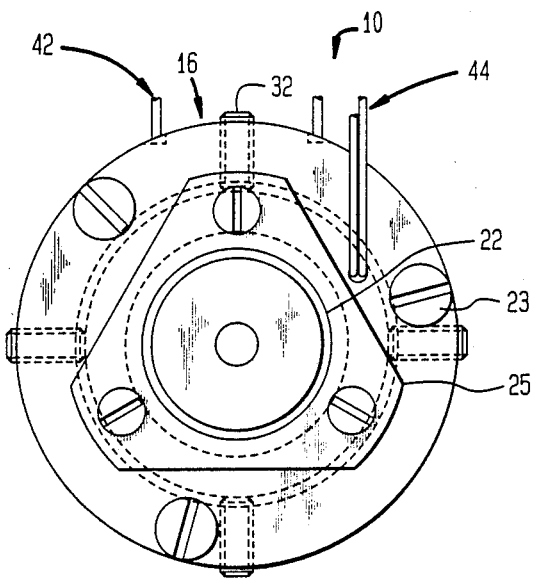
FIG. 3 is an end elevational view of the optical head.

Heat sink 22 is supported in head 10 by means of a retainer 25 which is fixed to mount 30. Retainer 25 is made from an insulating material, such as polycarbonate, and as shown in FIGS. 1 and 2, heat sink 22 does not contact mount 30 in order to prevent the conduction of heat between the heat sink 22 and mount 30. When screws 27 are tightened against retainer 25, heat sink 22, thermoelectric cooling element 20, and thermal transfer plate 40 are pressed against diode 18; the dimensions of element 20 and plate 40 are such that a spacing, shown at 34, is maintained between sink 22 and mount 30.

The thermoelectric cooling element 20 used in the present invention can be, for example, a Marlow, Model No. SP 1507. Thermoelectric cooling element 20 operates according to the well known Peltier effect. A cold junction is formed at the thermal transfer plate 40 which abuts against diode 18. Energy in the form of heat is absorbed by electrons as they pass from one semiconductor to another in element 20, and in so doing, moving from a low energy state to a high one. Power supplied to element 20 through electrical conductors 42 provides the energy required to move the electrons through the element. Heat is transferred to heat sink 22 at a hot junction 36 between element 20 and heat sink 22, and heat sink 22 expels the excess heat through a finned radiator (not shown) to the environment. The temperature of laser diode 18 is sensed through thermistor wires 44, and power to thermoelectric element 20 is controlled by a feedback circuit (not shown).

Optical device 14 includes a cylindrical lens housing 50, a collimator lens 52 in the housing, and a threaded lens retainer 57. Lens housing 50 is secured in support 16 by means of a threaded connection 54; and when lens housing 50 is in an operative position, an annular flange 56 on housing 50 abuts against spring loaded plungers 58 to maintain the lens housing 50 in position.

In the use of the present invention, the elements of head 10 will expand and contract with changes in ambient temperature. Each element will expand or contract according to the coefficient of thermal expansion (CTE) of the material of which it is made, and the amount of expansion or contraction for each degree of ambient temperature change will depend on a product which is equal to the CTE of the element times an effective length of the element. In the present invention, the elements of head 10 which determine the relative positions of laser 18 and lens 52 during temperature changes are the mounting means for laser diode 18 which is ring 24, the support means for the lens 52 which is the housing 50, and the support means for ring 24 and housing 50 which is tubular support 16. In modeling the changes in head 10 as a result of ambient temperature changes, housing 50 can be considered to be anchored to support 16 at an inner end 60 of threaded connection 54; thus the dimensions of housing 50, support 16, and ring 24 which must be used in the model are the dimensions h, s, and r, respectively, shown in FIG. 1. Dimensions h, s, and r can be viewed as the effective lengths of the respective elements along the optical axis 19 for purposes of considering the thermal expansion of these elements along the axis. In the present invention, the relative positions of laser diode 18 and lens 52 remain constant during ambient temperature changes, since the sum of the product $p_r$ (CTE×effective length) of ring 24 and the product $p_h$ of housing 50 is equal to the product $p_s$ of the support 16. Thus, the combination of the expansion or contraction of ring 24 and of housing 50 along axis 19 cancels the expansion or contraction of support 16 along axis 19; as a result, the relative positions of laser diode and lens 52 do no change. The lens 52 in the present invention has been constructed such that expansion or contraction of the lens itself does not need to be considered in the model of changes of head 10 as a result of ambient temperature changes; it is apparent, however, that for certain types of lenses and/or in certain types of applications the expansion or contraction of the lens may need to be considered in accordance with the inventive concept disclosed herein.

Laser diode 18 is held at a constant temperature by thermoelectric cooling element 20, and thus, diode 18 does not expand due to a change in ambient temperature. Consequently the relative positions of laser diode 18 and lens 52, during ambient temperature changes, are determined by the configuration and materials of the support 16, housing 50, and ring 24. In a preferred embodiment, support 16 is made from Austenitic stainless steel, housing 50 is made from 6061 aluminum, and ring 24 is made from Lexan 3414 glass filled polycarbonate. The material of laser mount 30 is also important in maintaining the proper relationship between laser diode 18 and lens 52. Laser mount 30 must be a conductor in order to reduce its thermal gradient and thereby prevent distortion; the CTE of mount 30 must be equal to, or slightly less, than the CTE of the support 16 to prevent distortion by compression between the anchor points on the support 16 due to the thermal expansion in the radial plane. It is preferred that the materials of all the elements in optical head 10 have an expansion that is linear across the desired operating temperature range. Also, it is important to maintain symmetry of the elements around the optical axis 19 to avoid angular misalignment due to uneven expansions.

As noted above, the CTE and the thermal conductivity of the materials have been carefully chosen. It is essential that the various elements be configured to keep the collimator lens 52 and laser diode 18 in focus over a large change in ambient temperature; at the same time the laser diode must be maintained at constant temperature. In a representative example of the present invention the dimensions s, h, and r, shown in FIG. 1, are, respectively, 1.2 inches, 0.665 inches, and 0.1925 inches. In an optical head of these dimensions in which support 16 is made from Austenitic stainless steel, housing 50 is made from 6061 aluminum, and ring 24 is made from Lexan 3414 glass filled polycarbonate, it has been found that the relative positions of laser diode 18 and lens 52 changed less than 5.4 nm per degree Centigrade when the ambient temperature was varied over a temperature range of 20° C. to 39° C.

This invention has been described in detail with particular reference to the preferred embodiment thereof, but it will be understood that variations and modifications can be effected within the spirit and scope of the invention. For example, although the present invention has been described with reference to a laser diode and a collimator lens, it will be apparent to those skilled in the art that the invention could be used with other elements in applications where it it necessary to maintain a precise spatial relationship between the elements over a relatively wide temperature range.

I claim:

1. An athermalized optical head comprising:
   a light source disposed along an optical axis of said optical head, said light source including a laser diode;
   a first mounting means for said light source;
   optical means disposed along said axis in a position to receive a light beam from said source, said optical means including a collimator lens;
   a second mounting means for said optical means; and
   support means for receiving said first and second mounting means and for maintaining said light source at a substantially constant distance from said optical means in a predetermined range of ambient temperatures.

2. An athermalized optical head, as defined in claim 1, wherein said second mounting means is formed from aluminum.

3. An athermalized optical head, as defined in claim 1, wherein said support means is formed from stainless steel.

4. An athermalized optical head as defined in claim 1, wherein said light source includes a thermoelectric cooling device for maintaining the temperature of said diode constant.

5. An athermalized optical head, as defined in claim 1, wherein said first mounting means is an insulator ring.

6. An athermalized optical head, as defined in claim 5, wherein said second mounting means is a housing for said optical means.

7. An athermalized optical head, as defined in claim 6, wherein said support means is a tubular support which is adapted to receive said ring and said housing.

8. An athermalized head comprising:
- a first operative element disposed along an axis of said head;
- a first mounting means for said element which has a product $p_r$;
- a second operative element disposed along said axis in a position to interact with said first operative element;
- a second mounting means for said second operative element which has a product $p_h$; and
- support means for receiving said first and second mounting means, said support means having a product of $p_s$, said product $p_s$ being equal to the sum of the products $p_h$ and $p_r$ where $p_r$ is the product of the CTE of the material of said first mounting means times an effective length thereof along said axis, $p_h$ is the product of the CTE of the material of said second mounting means times an effective length thereof along said axis, $p_s$ is the CTE of the material of the support means times an effective length thereof along said axis, the effective lengths of said support means and said mounting means being the respective length of a portion of each of said means, and the position of said operative elements upon a change in temperature being determined by the changes in the lengths of said portions.

9. An athermalized head, as defined in claim 8, wherein the effective length of said support means is greater than the sum of the effective lengths of said first and second mounting means.

* * * * *

UNITED STATES PATENT AND TRADEMARK OFFICE
CERTIFICATE OF CORRECTION

PATENT NO. : 4,948,221

DATED : August 14, 1990

INVENTOR(S) : Thomas E. Yates

It is certified that error appears in the above-identified patent and that said Letters Patent is hereby corrected as shown below:

Title page, INID Code [57], Abstract, line 1, "A" should read -- An --.
Column 2, line 36, "transFer" should read -- transfer --; and line 45, "glass" should read -- glass- --.
Column 3, line 21, "spring loaded" should read -- spring-loaded --.
Column 4, line 61, "receiving" should read -- supporting --.

Signed and Sealed this

Thirty-first Day of December, 1991

Attest:

HARRY F. MANBECK, JR.

*Attesting Officer*   *Commissioner of Patents and Trademarks*